Feb. 13, 1962 D. K. HAWKINS 3,020,650

DYNAMIC SERVO DRIVEN MAGNETOSTRICTIVE DELAY LINE

Filed Nov. 20, 1959 2 Sheets-Sheet 1

INVENTOR
DONALD K. HAWKINS

BY Charles L. Johnson, Jr.
ATTORNEY

Feb. 13, 1962 D. K. HAWKINS 3,020,650

DYNAMIC SERVO DRIVEN MAGNETOSTRICTIVE DELAY LINE

Filed Nov. 20, 1959 2 Sheets-Sheet 2

INVENTOR

DONALD K. HAWKINS

BY Charles L. Johnson, Jr.

ATTORNEY

United States Patent Office 3,020,650

Patented Feb. 13, 1962

3,020,650

DYNAMIC SERVO DRIVEN MAGNETOSTRICTIVE DELAY LINE

Donald K. Hawkins, College Park, Md., assignor to ACF Industries, Incorporated, New York, N.Y., a corporation of New Jersey Filed Nov. 20, 1959, Ser. No. 854,318
3 Claims. (Cl. 35—10.4)

This invention relates to delay lines or, more particularly, to servo driven magnetostrictive delay lines which provide a continuously variable delayed output pulse.

In many types of electronic equipment the need arises for a delay line in which a pulse or other signal must be delayed a finite time from some initiating pulse. Two well known types of delay lines commonly used are the D.C. controlled phantastron circuit and the digital computer delay line. The D.C. controlled phantastron system generally has poor linearity of delay due to component variation and supply voltage changes as well as delayed pulse jitter and the absence of dynamic delayed pulse response. The standard digital computer system provides no continuous delay without extremely expensive or large systems. Again the absence of dynamic delayed pulse response is a factor in the digital computer delay lines. It is therefore an object of this invention to provide an automatic continuously variable delayed pulse of high accuracy and having large delayed ratio time.

Another object of this invention is to provide a servo driven magnetostrictive delay line having a delayed ratio from 0 to 100 microseconds.

It is a further object of this invention to provide apparatus for simulating the checkout equipment of a search system in which a delayed pulse is generated by use of servo amplifier apparatus.

Other objects and novel features of the invention are set forth in the appended claims and the invention as to its organization and its mode of operation will best be understood by consideration of the following detailed description of the preferred embodiment when used in connection with the accompanying drawings which are hereby made a part of the specification in which:

FIG. 3 is a representation of an oscilloscope display.

A preferred embodiment of the invention provides apparatus for teaching the automatic checkout procedures for search equipment and, more particularly, for providing automatic delay apparatus for simulating the operational variations which occur during the search operation.

In the following detailed description of the apparatus by which the objects of the invention are realized the various arrangements of elements are described from their use in a preferred embodiment and it should be realized that changes and modifications may occur to one skilled in the art without departing from the spirit of the invention.

Figure 1:
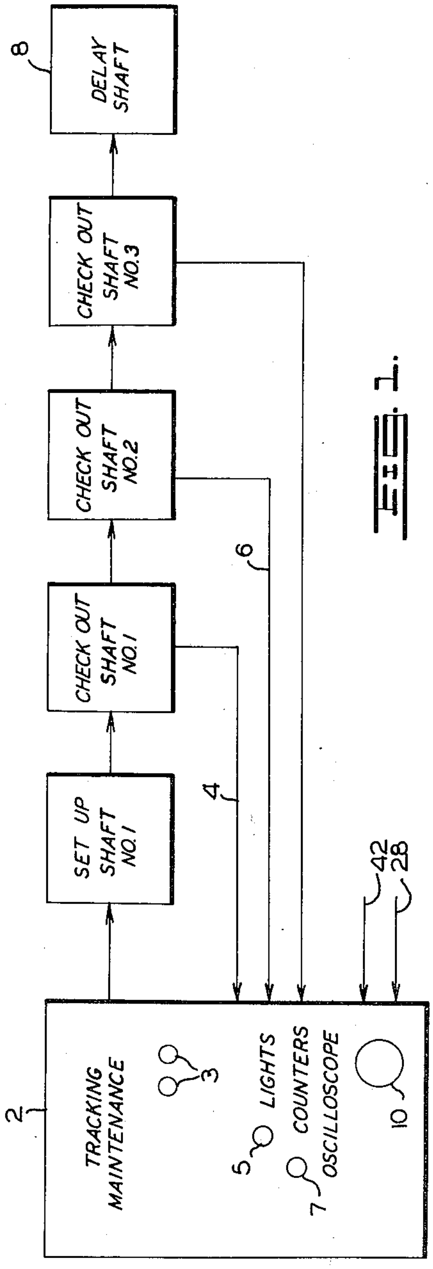
FIG. 1 is a block diagram of the tracking maintenance system of simulated search checkout apparatus.

FIG. 1 shows in block diagram form the equipment required for teaching checkout procedures for search equipment. A tracking maintenance console 2 has facilities for a student to start and operate an automatic checkout system. When the student instigates a checkout, by controls 3, the setup shaft No. 1 automatically activates the checkout shaft No. 1 which feeds information by conductor 4 back to the console to indicate to the student that checkout shaft No. 1 is operating properly. Checkout shaft No. 1, if operating correctly, automatically keys checkout shaft No. 2 which sends information back via conductor 6 to the console 2. Feedback information is presented by the lights 5, counters 7 and oscilloscope 10. Checkout shaft 2, in turn, activates shaft No. 3 which, in turn, permits the delay shaft 8 to operate in a manner to be later described.

Figure 2:
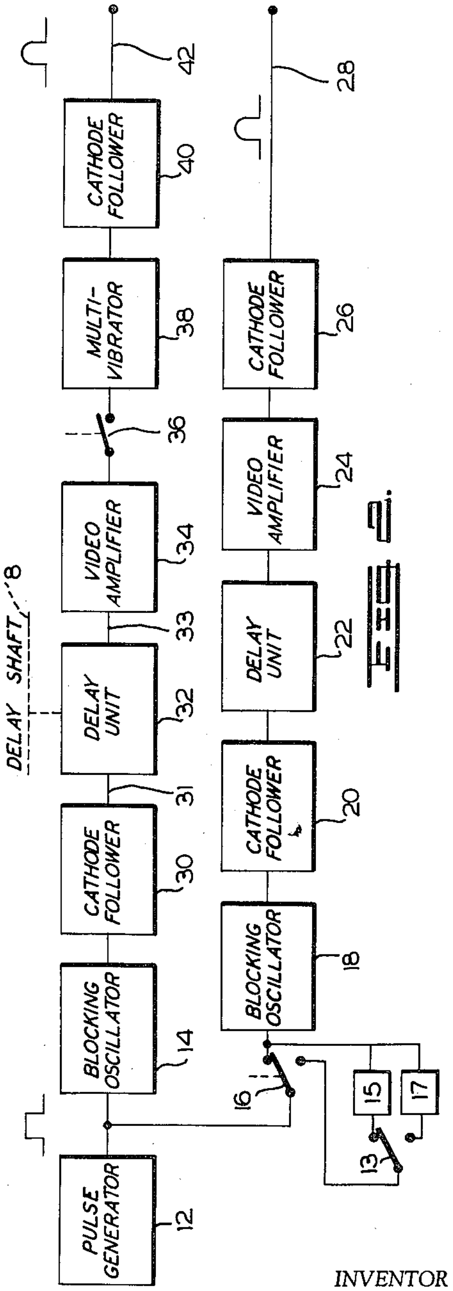
FIG. 2 is a block diagram of the pulse generating system.

One phase of operator training involves an oscilloscope presentation in which an object being tracked deviates from a prescribed course, this deviation appearing as a lateral displacement of the video trace upon the student's oscilloscope 10. The pulse generating circuit block diagrams of FIG. 2 are used to generate the pulses which initiate the gate and video voltages for application to the oscilloscope 10. The pulse generator 12 generates the pulse shown which is applied directly to the blocking oscillator 14 and through switch 16 to blocking oscillator 18 when the switch is in the normal position, as shown. If the switch 16 is placed in the down or delay position the output of pulse generator 12 is applied to the switch 13 which may be activated to connect the arm of switch 13 to either of the delay circuits 15 or 17. The outputs of delay circuits 15 and 17 are connected together and to the input of the blocking oscillator 18. The output of the blocking oscillator 18 is fed to a conventional cathode follower 20, to the delay unit 22, to the video amplifier 24, to the cathode follower 26 and then to conductor 28. It may be seen that the delay between he output of the pulse generator 12 and the pulse appearing on conductor 28 is determined almost entirely by the delay unit 22 when switch 16 is in this normal condition. However, when switch 16 is placed in the delay or down position the pulse from generator 12 is applied to either delay unit 15 or 17. These units may be of any standard time delay circuit type and in the preferred embodiment were adjusted to represent the delay equivalent to 6 and 12 miles range, respectively. The outputs of delay units 15 and 17 are connected to the input of the blocking oscillator 18. Thus, the signal output on conductor 28 may be any one of three types, namely, a normal pulse which occurs when switch 16 is in the up position, a first time delay pulse or a second time delay pulse which depends upon the position of switches 16 and 13.

The output of blocking oscillator 14 is conducted to cathode follower 30 to the delay unit 32 which has input conductor 31 and output conductor 33 and which is activated by the delay shaft 8. The conductor 33 feeds video amplifier 34 which, in turn, is connected to the disable switch 36. The output of this switch, when closed, is connected to multivibrator 38 which, in turn, is tied to the conventional cathode follower 40 whose output is represented by lead 42. It may thus be seen that the pulse appearing on the output conductor 42 is delayed in time from the output of pulse generator 12 by a time dependent upon the position of the delay shaft 8. The use of the pulses appearing on conductors 28 and 42 will be described in relation to FIG. 3 and FIG. 4, while being represented generally in FIG. 1 as inputs to the console 2.

During the tracking operation of a moving object, search equipment will normally provide an oscilloscope presentation as indicated at FIG. 3*a* in which the lower gate notch represents an area being observed by an antenna and the vertical video signal at its center represents or indicates that the object being tracked is directly in line with the search antenna or tracking device. Deviation from a central position represents miles off-course for the tracked object. FIG. 3*b* shows the positioning of the gate and video when the simulated object being tracked diverts or jumps from the expected line of travel to another position. This gate and video movement is accomplished by the delays present on conductors 28 and 42 while the simulation of equipment corrective action is represented by the servo action of the delay shaft.

Figures 4, 5:
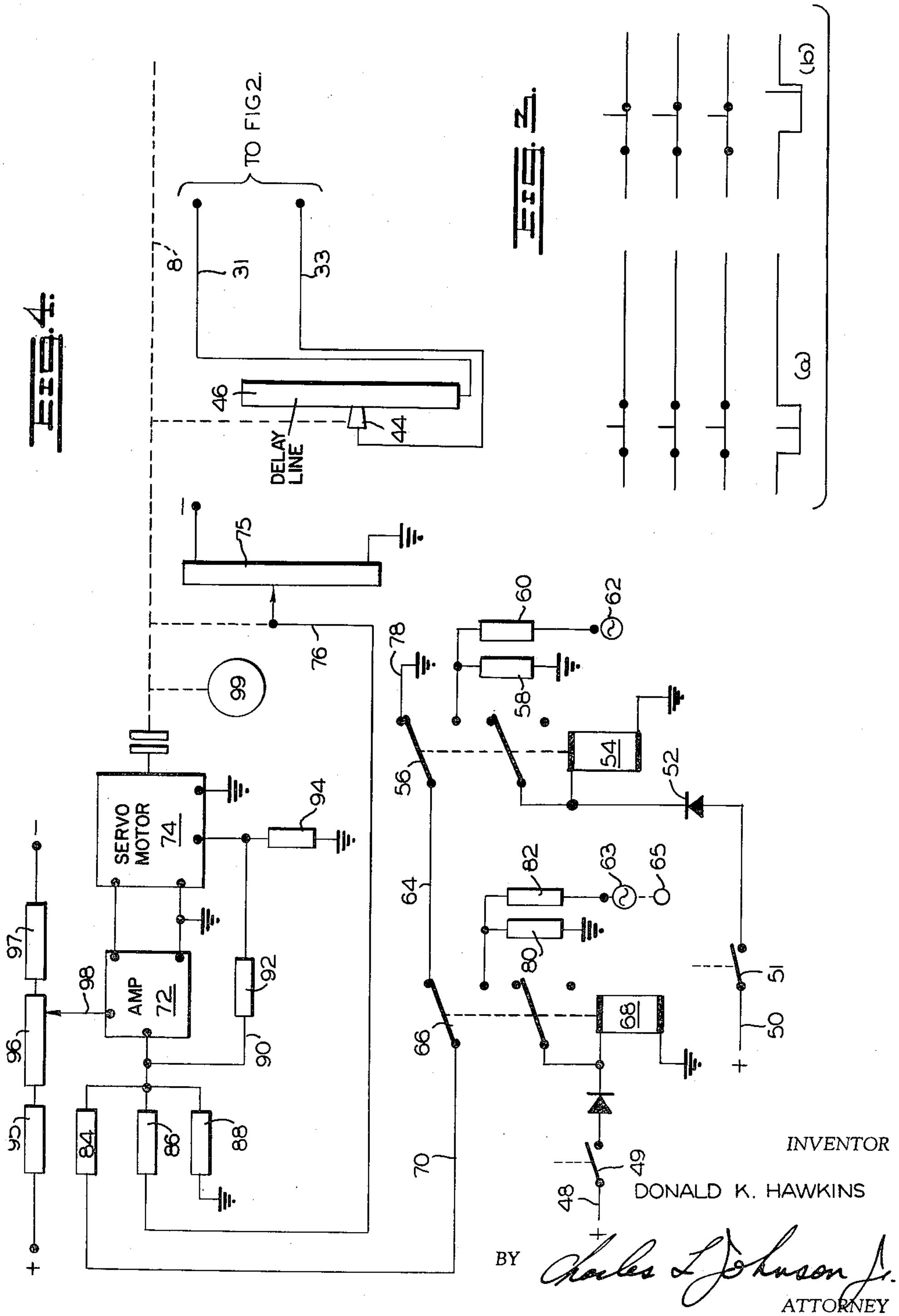
FIG. 4 is a schematic diagram of the servo delay unit.

FIG. 4 is a schematic illustration of the servo driven delay line. The delay line is of the magnetostrictive type in which a pickup coil is movable along the length of the line to vary the delay time between input and output pulses. The delay shaft 8 drives the arm 44 of the delay line 46 to drive the delay line pickup coil element so that the output pulse at conductor 33 responds in time to the functions of the motor amplifier input drive signal. The input pulse on conductor 31 is thereby delayed through the delay line 46 and picked up by the arm 44 which is connected to the output conductor 33. At FIG. 4 conductors 48 and 50 represent various delays which the system may simulate. If, for example, the student desires to place in a twelve mile delay representing a twelve mile variation in the position of the object being tracked he will depress switches 16 and 13 of FIG. 2 to thereby provide an output pulse on conductor 28 which is delayed twelve miles timewise from the pulse generated by the pulse generator 12. In so doing, the video pulse represented in FIG. 3*b* will move to the right a distance representing twelve miles. This is due to the video pulse being triggered by the delayed pulse from conductor 28. If at the same time as his activation of switch 16 the student activates switch 51 of FIG. 4 a D.C. voltage is applied through rectifier 52 to relay 54 which energizes to connect arm 56 to the voltage divider made up of impedances 58 and 60. By so doing a proportion of the A.C. voltage present from source 62 will be applied through conductors 64, the contact 66 of relay 68 to conductor 70 which acts as an input to the amplifier 72. Amplifier 72 provides output voltage which will activate the servo motor 74 to drive the delay shaft 8 so as to servo to the position where the voltage on the feedback arm 76 will balance the input voltage on conductor 70. The potentiometer 75 may be designated as the feedback potentiometer. It is thus seen that the servo which had previously servoed to the ground potential of ground conductor 78 has now servoed to a voltage representing the twelve mile distance. It should be noted that while the arm of potentiometer 75 has moved from ground to a twelve mile position, the pickup coil of the delay line 46 has moved from a position of no delay to a position representing twelve miles delay. The delay line output on conductor 33 may be followed in FIG. 2 through the video amplifier 34, switch 36, multivibrator 38 and cathode follower 40 to conductor 42. This pulse is used to trigger the notch gate appearing in FIGS. 3*a* and 3*b*.

In checking out the search equipment the proper sequence of presentations should be a display such as in FIG. 3*a* representing normal operation then a jump to the video representation of FIG. 3*b* and then the gradual movement of the notch gate to a central position surrounding the vertical video signal. The operation may best be understood by remembering that the notch or gate of FIGS. 3*a*, 3*b* is triggered by the pulse on conductor 42 of FIG. 2 while the video signal of FIG. 3 is triggered by the pulse present on conductor 28. Normal operation or tracking is simulated by utilizing the pulses of conductors 42 and 28 to trigger the gate and video as represented by FIG. 3*a*. At this time, the delay line 46 is servoed to the lower or no delay position. At the instant of the introduction of a simulated jump or position variation in the object being tracked the pulse at conductor 28 and the video of FIG. 3*b* is delayed by a time resulting from the delay circuit 15 or 17 and the servo drives the delay line arm 44 to reposition the notch gate display from the side of the gate as shown in FIG. 3*b* to a central position as shown in FIG. 3*a*. The FIG. 3 display is presented on the scope 10.

In a similar manner other distances or variations may be accomplished by different servo voltages. For instance, the activation of relay 68 by means of switch 49 and the voltage present on conductor 48 may be used to activate a voltage divider in which impedances 80 and 82 will determine the potential appearing on arm 66 and conductor 70. The generator 63 is shown connected between the impedance 82 and the control 65. By this arrangement the output of generator 63 may be varied in amplitude to thereby cause the servo shaft 8 and the delay pulse at conductor 33 to vary continuously. This apparatus may thus be utilized with any type of drive to automatically provide a continuously variable time delayed output.

Impedances 84 and 86 in the preferred embodiment have identical values but any ratio may be utilized it being understood the position of shaft 8 will depend on the ratio of the input impedance 84 to the feedback impedance 86. The amplifier input is returned to ground by means of impedance 88. The motor generator 74 provides a tachometer feedback potential by means of conductor 90 to damp out any oscillations which might occur due to the rapid operation of the motor. Impedances 92 and 94 provide the proper damping voltage at conductor 90, and impedances 95, 96 and 97 are connected between plus and minus phase balancing voltages to provide by means of arm 98 a method of balancing the amplifier 72 so there will be no drive to the motor generator 74 when the input lead 70 is grounded. A dial 99 is provided for convenient indication of the amount of rotation of the delay shaft 8. By operation of the delay line servo the initial display of the targets displacement from the central position is corrected by the movement of the servo shaft 8 so as to delay the pulse on conductor 33 and 42 by a sufficient amount to present the gate centrally around the video pulse to indicate proper tracking operation of the search equipment.

The circuit components of FIG. 2, such as the video amplifier, blocking oscillator, multivibrator and cathode follower may be of any standard type some examples of which are illustrated in Vol. 18 of the Radiation Laboratory Series by Valley and Wallman.

In a preferred embodiment, the component values of FIG. 4 are as follows: Values are in ohms.

| | |
|---|---|
| 75 | 5000 |
| 84 | 500K |
| 86 | 500K |
| 88 | 22K |
| 92 | 1M |
| 94 | 3.9K |
| 95 | 20K |
| 96 | 5K |
| 97 | 20K |

Plus and minus designations represent the phase relationship of two 6.3 VAC signals which are 180° out of phase.

The delay system described can provide a continuously variable delay which is operationally free from the effects of power supply and component value changes and which yields a wide dynamic range of operation in small low cost equipment.

Automatic delay line applications exist whereby the apparatus described is ideal for pulse delay measurements, pulse coincidence for variable or preset time measurements and pulse coincidence for variable or preset quantity measurements.

It should be understood that this invention is not limited to specific details of construction and arrangement thereof herein illustrated and that changes and modifications may occur to one skilled in the art without departing from the spirit of the invention; this scope of the invention being set forth in the following claims:

What is claimed is:

1. Continuous delay apparatus comprising a delay line having a movable arm, input signal means associated with the said delay line, servo means operatively connected to the said movable arm and responsive to a variable servo input signal for causing movement of the said arm to a position whereby an output signal is continuously developed which is delayed in time from the delay line input signal an amount of time proportional to the amplitude of the said servo input signal, means for impressing a first alternating voltage on the input of said servo means and changing the magnitude of said voltage to provide said variable servo input signal, and variable means operatively connected to said servo means for movement in unison with said movable arm for applying a second alternating voltage to the input of the servo means to provide a feedback signal to balance said first alternating voltage.

2. Training apparatus comprising a first pulse generating means for triggering a gate pulse, said means including a servo driven delay line and being responsive to an applied voltage for adjusting said delay line, whereby the gate pulse may automatically be varied in time, manually controllable means for applying voltages of different magnitudes to said last named means, a second pulse generating means for triggering a video pulse, said second means including a delay circuit which may be serially inserted or removed from the second means to thereby alter the time occurrence of a video pulse, and display means responsive to the output signals of the said first and second means whereby a varying display indicative of search tracking operations may be presented.

3. Simulated radar object tracking apparatus comprising first pulse means for generating a gate signal, second pulse means for generating a video signal, said second means including a fixed delay circuit for altering the time reference of the video signal and said first means including an automatic servo delay line for automatically repositioning the said gate signal relative to the said video signal, and display means for visually representing the relative time occurrence of the said gate and video signals.

References Cited in the file of this patent

UNITED STATES PATENTS

| | | |
|---|---|---|
| 2,742,618 | Weber | Apr. 17, 1956 |
| 2,781,495 | Fredrick | Feb. 12, 1957 |
| 2,811,696 | Berkley | Oct. 29, 1957 |
| 2,854,658 | Jones | Sept. 30, 1958 |
| 2,922,157 | McShan | Jan. 19, 1960 |